United States Patent
Arlitt et al.

(10) Patent No.: US 8,678,745 B2
(45) Date of Patent: Mar. 25, 2014

(54) ROTOR BLADE DESIGN FOR A WELLS TURBINE

(75) Inventors: Raphael Arlitt, Ulm (DE); Thomas Carolus, Netphen (DE); Ken Tease, Inverness (GB)

(73) Assignee: Voith Patent GmbH, Heidenheim (DE)

( * ) Notice: Subject to any disclaimer, the term of this patent is extended or adjusted under 35 U.S.C. 154(b) by 721 days.

(21) Appl. No.: 12/735,589

(22) PCT Filed: Jan. 31, 2009

(86) PCT No.: PCT/EP2009/000648
§ 371 (c)(1),
(2), (4) Date: Jan. 6, 2011

(87) PCT Pub. No.: WO2009/098007
PCT Pub. Date: Aug. 13, 2009

(65) Prior Publication Data
US 2011/0142656 A1   Jun. 16, 2011

(30) Foreign Application Priority Data

Feb. 4, 2008 (DE) .......................... 10 2008 007 616

(51) Int. Cl.
*F03B 13/12* (2006.01)
(52) U.S. Cl.
USPC .................. 415/3.1; 416/223 A; 416/242
(58) Field of Classification Search
USPC ............ 415/2.1, 3.1; 416/223 A, 223 R, 242, 416/243, DIG. 4; 290/42, 43, 53, 54
See application file for complete search history.

(56) References Cited

U.S. PATENT DOCUMENTS

| | | | |
|---|---|---|---|
| 3,578,264 A * | 5/1971 | Kuethe | 244/200.1 |
| 4,236,866 A | 12/1980 | Martinez | |
| 5,191,225 A | 3/1993 | Wells | |
| 2005/0285407 A1 * | 12/2005 | Davis et al. | 290/54 |

FOREIGN PATENT DOCUMENTS

| | | |
|---|---|---|
| FR | 2543225 A1 | 9/1984 |
| GB | 1574379 A | 9/1980 |
| GB | 2440344 A | 1/2008 |

OTHER PUBLICATIONS

Setoguchi, et al. "A review of impulse turbines for wave energy conversion" Renewable Energy, Pergamon Press, Oxford, GB, Bd. 23, Nr. 2, 1. (Jun. 1, 2001).
Carolus, Thomas, "Ventilatoren, Aerodynamischer Entwurf, Schallvorhersage, Konstruktion" (2003).
Australian Office Action, dated Oct. 16, 2013 for Australian Patent Application No. 2009211831

* cited by examiner

*Primary Examiner* — Ned Landrum
*Assistant Examiner* — Liam McDowell
(74) *Attorney, Agent, or Firm* — Farjami & Farjami LLP (57) ABSTRACT

The invention relates to a Wells turbine, comprising
a hub having a plurality of rotor blades having a drop-shaped symmetrical profile originating from a leading edge;
the rotor blades have a threading line, whose course in the rotation plane of the Wells turbine deviates in relation to a radial beam associated with the respective rotor blade at least in parts of the radial extension of the rotor blade, the threading line comprising at least one curved area.

12 Claims, 7 Drawing Sheets

ROTOR BLADE DESIGN FOR A WELLS TURBINE

This is a U.S. national phase application which is based on, and claims priority from, PCT application Serial No. PCT/EP2009/000648, filed on Jan. 31, 2009, which claims priority from foreign application Serial No. DE 102008007616.3, filed on Feb. 4, 2008, in Germany.

BACKGROUND

The invention relates to a rotor blade design for a Wells turbine, in particular for use in a wave powerplant Wells turbines are known—reference is made to GB 1574379 A in this regard, for example. Turbines of this type are designed for a bidirectional, essentially axial inflow, the rotor of a Wells turbine maintaining the revolution direction independently of the direction of the inflow. The rotor typically comprises a hub having rotor blades which are distributed around the outer circumference and point radially outward. The rotor blades are designed symmetrically to the rotation plane, in general drop-shaped airfoil profiles being used as the profiles. Furthermore, the rotor blades are typically linked on rigidly. However, designs having adjustable-angle rotor blades are also known, the above-mentioned symmetry plane of the rotor blades lying in the rotation plane in the neutral position in this case.

Furthermore, U.S. Pat. No. 5,191,225 A discloses a wave powerplant, in which a two-stage Wells turbine is received in a flow duct and is driven by a bidirectional airflow. In a wave powerplant of this construction, energy is obtained from an oscillating water column. For this purpose, a wave chamber is provided, which has an inflow opening lying below the water level. If a wave breaks against the outer wall of the wave chamber, an flow of sea water occurs into the interior of the chamber, whereby the water level in the chamber rises. The water level will drop accordingly in the event of an outgoing wave, so that an oscillation movement of the water column in the wave chamber results, which approximately corresponds to the wave frequency. An air mass is enclosed above the water level in the wave chamber, which is connected to the environmental atmosphere by a limited ventilation duct. In accordance with the oscillation movement of the water body in the wave chamber, the air mass located above it will be subject to a pressure variation, so that a continuously changing, bidirectional airflow of high velocity arises for pressure compensation in the ventilation duct, which can be used to acquire electrical energy.

A possible profile course for the rotor blades of a Wells turbine is given by the four-digit NACA series. Thus, the NACA 0012 profile describes a profile contour having a thickness of 12% in relation to the chord length. The profile chord and thus the line of symmetry of the profile run parallel to the rotation plane of the turbine. During operation of the Wells turbine, an effective inflow angle against the profile of the respective turbine blades exists, which results through the vector addition of the peripheral velocity and the inflow velocity of the driving airflow. The inflow angles are typically small, so that the symmetrical profile acts in terms of an airfoil and the forces engaging on the aerodynamic center have a partial component in the tangential direction in relation to the hub of the Wells turbine, which is used for propulsion. The further aerodynamic forces perpendicular to this tangential direction are to be absorbed via the turbine bearings.

The difficulty results for Wells turbines, in addition to the problems of high noise emission and poor startup behavior, that with increasing inflow angle, typically from 13°, a flow stall can occur at the turbine blades. Such a large inflow angle can occur for large flow coefficients, if a rapid increase of the inflow velocity exists because of a strongly varying airflow and the rise of the peripheral velocity of the Wells turbine does not occur rapidly enough, and/or it already runs at its rated speed.

SUMMARY

The invention is based on the object of designing a Wells turbine so that the operating range is expanded and a stall of the flow at the rotor blades is shifted toward higher flow coefficients. Furthermore, the Wells turbine is to be distinguished by simplicity in design and manufacturing and a high efficiency.

The invention is achieved by the features of independent claim. Advantageous embodiments result from the sub-claims.

The inventors have recognized that a rotor blade geometry for which the threading line of the profile sections in the rotation plane is curved in relation to the radial direction delays a flow stall in the case of higher flow coefficients and thus enlarges the operating range of the Wells turbine. This essentially relates to designs having a threading line which leads in relation to the radial beam at least in parts in the peripheral direction.

For an embodiment of a curved rotor blade geometry having a lag to the radial beam, the overall efficiency can be increased for an operational range for which a flow separation only exists locally in the area close to the hub and not over a substantial part of the radial extension of the rotor blade. This circumstance also follows from a flow concentration, because of the rotor blade geometry, in connection with a velocity increase of the inflow in the radially outer areas of the rotor blade. Because of the longer lever arm of the outer rotor blade areas, an overall higher power is taken from the flow. Furthermore, using the rotor blade geometry according to the invention, in particular in the case of the selection of a threading line which is curved at least in parts, the losses which arise due to acoustic effects in typical rotor blades are reduced.

For a first embodiment variant of the rotor blades according to the invention, a curvature relative to the radial beam exists at least in parts of the longitudinal extension of the threading line. An angular deviation in relation to the radial beam of at least 5° is preferred. For an alternative embodiment, the course of the threading line of a rotor blade is curved so that a sickle-shaped blade geometry arises. For this case, a lead or lag of the rotor blade tip of at least 5° to the radial beam is preferred for the minimum deviation of a sickle-shaped threading line from the radial beam.

In the present case, the term "radial beam" is understood as a straight line which is in the rotation plane of the Wells turbine and which runs, starting from the rotational axis of the Wells turbine, radially through the base of the assigned rotor blade. The base is established as the intersection of the threading line with the support structure, typically the hub of the Wells turbine. The concept of a threading line is defined in the present case so that it arises through the connection line of characteristic points of the profile sections. This can be the intersection of the camber line with the center line of a profile section or a point on the camber line for a predefined profile depth, for example, at one-fourth of the profile depth. In the latter case, the characteristic point is the engagement point of the aerodynamic forces for the respective profile section. Independently of the selection made in the specific case to establish the threading line, it is to be true for a rotor blade geometry according to the invention that a deviation to the course of the radial beam exists in the rotation plane due to the curvature.

A further advantage which results in addition to the flow stabilization for a rotor blade geometry according to the invention can be seen in the reduced noise emission. In particular sickle-shaped designs of the rotor blades are distinguished by a reduced noise generation. Further acoustic improvements may be caused by symmetry breaking in the peripheral direction. For a geometry according to the invention, for example, a variation of the radius-dependent deviation of the threading line from the radial beam may be selected for sequential rotor blades. Furthermore, a curvature of the threading line in relation to the radial beam allows the leading or trailing area to traverse fixed flow obstructions, such as struts or baffles, over a broader rotational angle range of the Wells turbine, so that the occurrence of pressure pulses on the rotor blades is reduced.

BRIEF DESCRIPTION OF THE DRAWINGS

The invention is explained in greater detail hereafter on the basis of exemplary embodiments and in connection with illustrations in the figures. In the figures.

DETAILED DESCRIPTION

Figure 1:
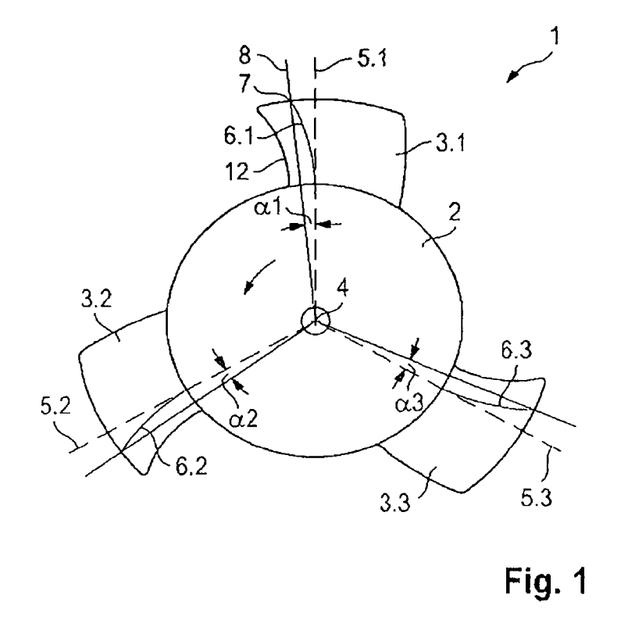
FIG. 1 shows a top view of the rotational plane of a Wells turbine of an embodiment of the invention having rotor blades running in a sickle shape.

FIG. 1 shows a top view in the axial direction of a Wells turbine 1 designed according to the invention. A hub 2 having an exemplary configuration of three rotor blades 3.1, 3.2, and 3.3 is outlined. These blades are distributed equidistantly, i.e., having an angular spacing of 120°, around the circumference of the hub 2. A radial beam 5.1, 5.2, 5.3 originating from the rotational axis 4 of the hub 2 is shown for each of the rotor blades 3.1, 3.2, 3.3. This radial beam represents a straight line pointing in the radial direction, which runs through the respective base of the rotor blade 3.1, 3.2, 3.3. For the profile section directly adjoining the hub 2, the point at one-fourth of the profile depth on the profile chord is established as the base.

According to the invention, the geometry of the rotor blades 3.1, 3.2, 3.3 is selected so that the threading line 6.1, 6.2, 6.3 deviates at least in parts from the course of the radial beam 5.1, 5.2, 5.3 because of the curvature. The threading line is understood as the connection of defined points of the profile sections. In the present case, this is the point on the profile chord at one-fourth of the profile depth. A threading line can be composed of other characteristic points of the profile, for example, the intersection of the center line with the camber line. For this case, to establish the radial beam, the base of the profile section adjoining the hub is selected accordingly. The rotor blade geometry according to the invention is distinguished in that for each possible selection of the threading line, it deviates at least in parts along its radial extension from the radial beam. In general, this deviation is a radius-dependent function.

For the embodiment outlined in FIG. 1, the deviation from the radial beam occurs in the form of a curved threading line, so that sickle-shaped rotor blade geometries arise. For the variant shown, the sickle shape points in the direction of the revolution of the Wells turbine. Accordingly, the point of the greatest radial beam deviation 7 to the threading line 6.1, 6.2, 6.3 lies on the radial outer edge of the rotor blade, a lead existing for the design shown.

An angle deviation $\alpha 1$, $\alpha 2$, $\alpha 3$ can be ascertained between the radial straight line 8 through the point of the greatest radial beam deviation 7 and the radial beam 5.1, 5.2, 5.3 for the respective rotor blade 3.1, 3.2, 3.3. The angle deviations $\alpha 1$, $\alpha 2$, $\alpha 3$ do not necessarily have to correspond. It is possible that the threading line in the rotation plane leads the radial beam 5.1, 5.2, 5.3 and thus generates a curve in the forward direction. Alternatively, a lag can also exists, i.e., a curve opposite to the rotational direction. With respect to the noise reduction, rotor blade geometries having a lead or a lag to the radial beam 5.1, 5.2, 5.3 are advantageous. Furthermore, it is conceivable to select a sickle-shaped course of the threading line 6.1, 6.2, 6.3, which leads back to the radial beam 5.1, 5.2, 5.3 again in the radially outermost point of the rotor blade 3.1, 3.2, 3.3. Such an embodiment is illustrated as an example hereafter on the basis of FIGS. 6 and 7.

Figure 2:
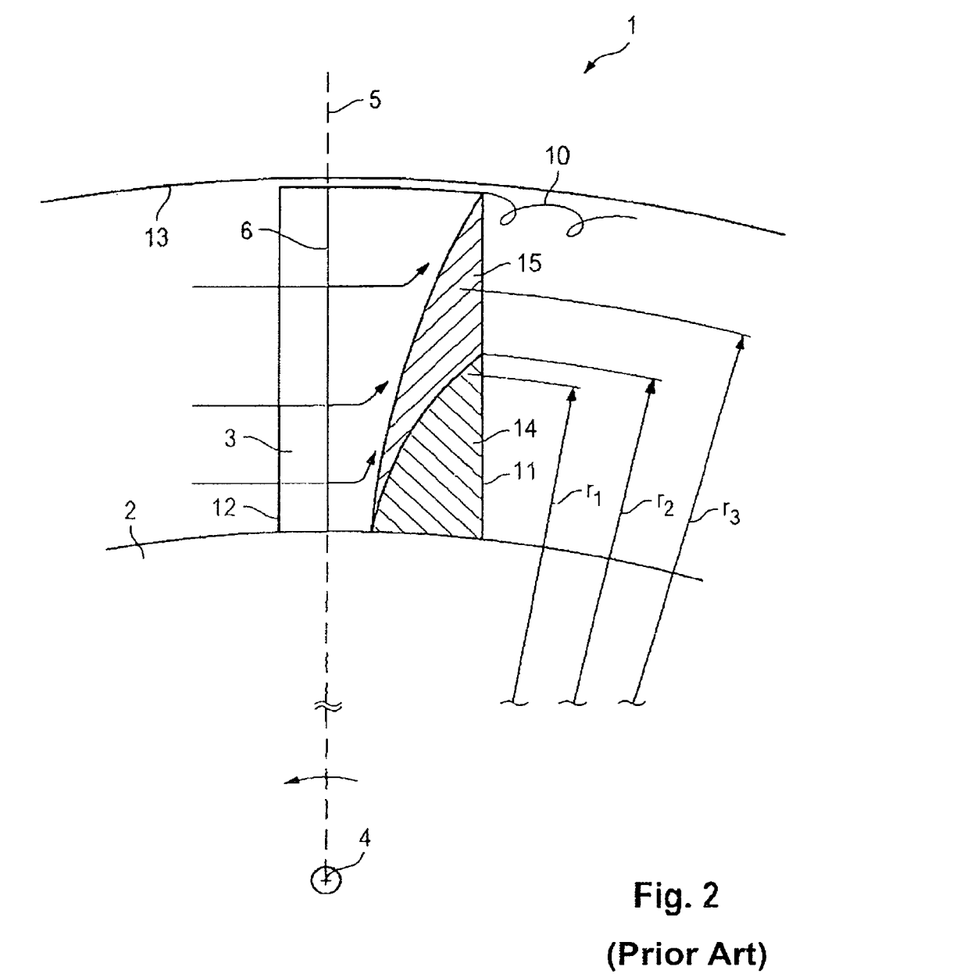
FIG. 2 shows the inflow conditions in the case of a flow separation for a rotor blade having radial beam geometry corresponding to the prior art.
Figure 3A:
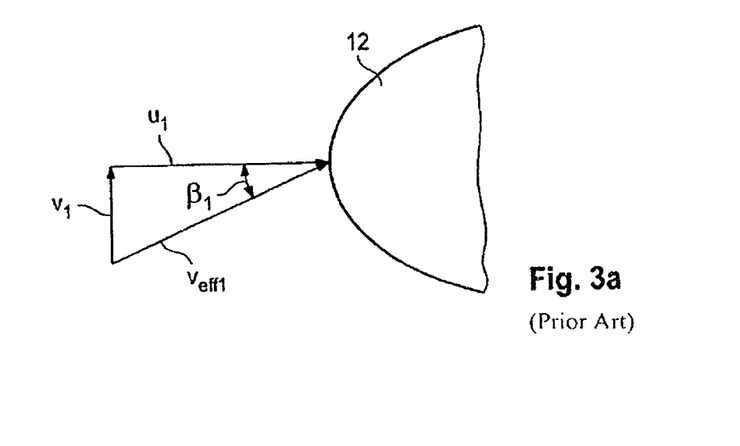
FIGS. 3a and 3b show the inflow of the rotor blade shown in FIG. 2 for the radii $r_1$ and $r_3$.
Figure 3B:
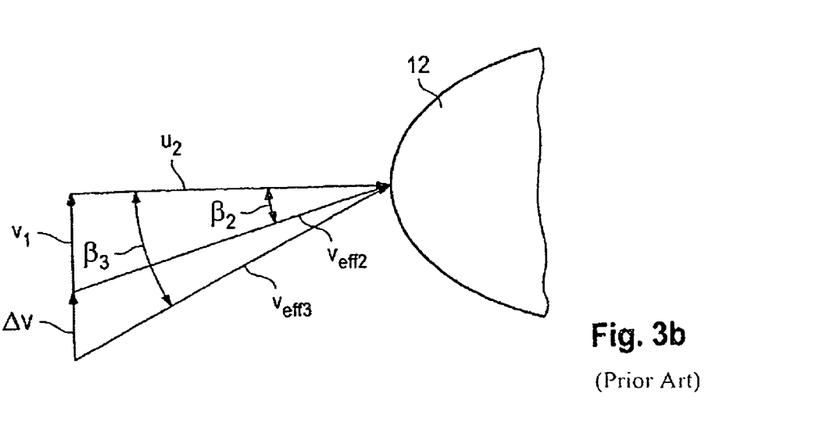
Figure 4:
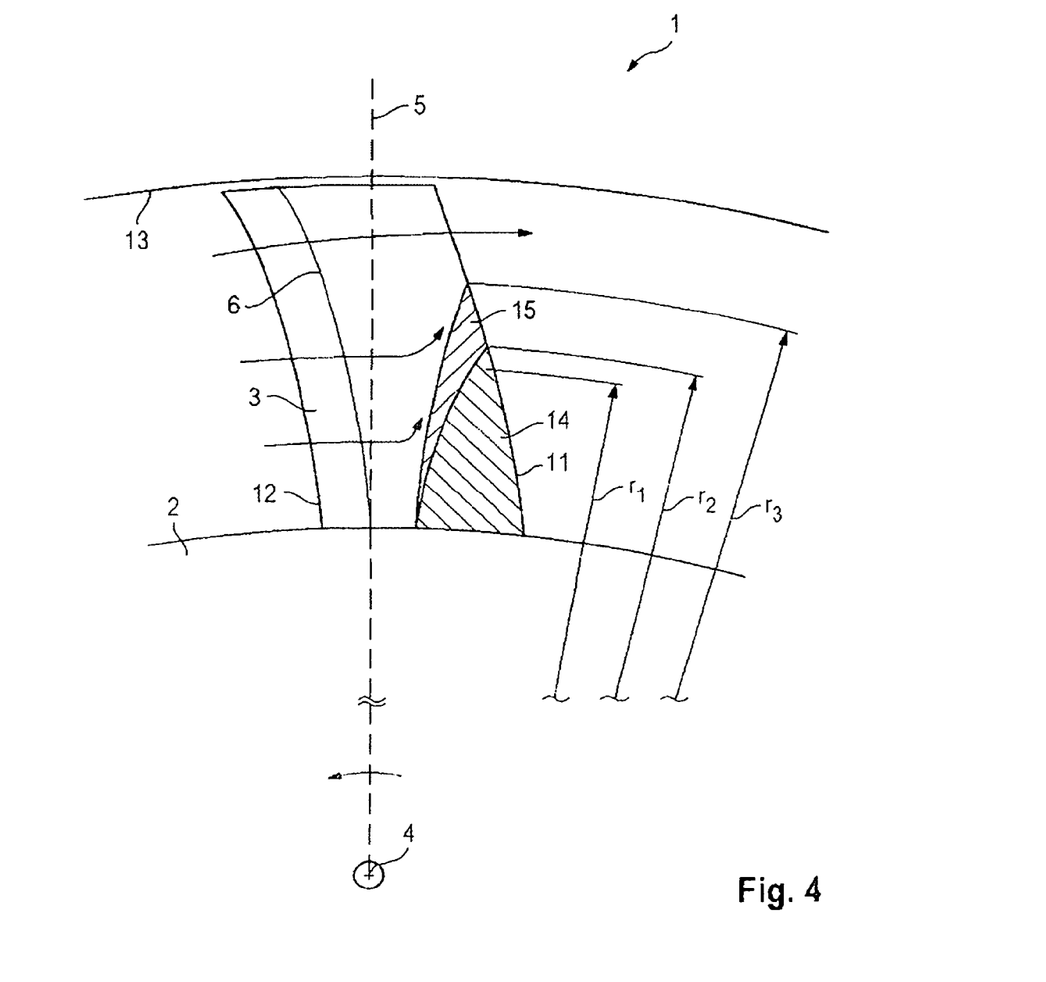
FIG. 4 shows the flow separation in the case of a rotor blade according to the invention having a threading line which is curved in the peripheral direction of the Wells turbine in relation to the radial beam in the peripheral direction.

The advantage which results from the design according to the invention of the rotor blades with respect to a flow separation is obvious from FIGS. 2 to 4. The case is shown of a high flow coefficient and thus a high axial velocity of the driving flow in relation to the peripheral velocity of the rotor blades.

In FIG. 2, which shows a rotor blade 3 having radial beam geometry according to the prior art, a first area 14 is outlined, in which a flow separation occurs, and a blade tip eddy 10 is shown. This first area 14 is close to the hub and extends on the rear edge 11 of the rotor blade 3 up to the radius $r_2$.

The inflow conditions for the radii $r_1$ and $r_3$ from FIG. 2 are each shown on the leading edge 12 in FIGS. 3a and 3b. For the radius $r_1$, FIG. 3a shows the vectorial velocity addition of a first peripheral velocity $u_1$ and inflow velocity $v_1$, which results in a first effective inflow velocity $v_{\mathit{eff}1}$ having a first angle of attack $\beta_1$. This first angle of attack $\beta_1$ exceeds a critical value, so that a flow separation results at a specific point of the flow along the profile. In comparison thereto, in FIG. 3b, which illustrates the inflow conditions for the radius $r_3$, the second effective inflow velocity $v_{\mathit{eff}2}$ is shown, which results from the vector addition of the inflow velocity v1 and the second peripheral velocity $u_2$, which is higher in relation to radius $r_1$. Correspondingly, a second angle of attack $\beta_2$ arises, which is less than the first angle of attack $\beta_1$ and which falls below the critical angle of attack at which flow separation occurs. However, because of the separation in the first area 14, a blockade of the radially inner inflow of the rotor blade 3 occurs, so that flow components oriented radially outward exist corresponding to the flow deflection outlined in FIG. 2, which elevate the original inflow velocity in the area of the radius $r_3$ by the absolute value $\Delta v$. According to FIG.

3b, this increase of the inflow velocity results in a third effective inflow velocity $v_{\text{eff3}}$, having an associated third inflow angle $\beta_3$, which is again above the threshold of separation.

It accordingly follows that for the conditions shown in FIG. 2, a flow stall also exists in a second area 15. Correspondingly, the flow stall draws essentially over the entire radial extension of the rotor blade 3 and extends up to its radially outer areas, which adjoins the wall 13 of the flow duct. The efficiency will drop strongly as a result.

It is explained hereafter on the basis of FIG. 4 that the separation threshold can be shifted toward greater flow coefficients using a rotor blade geometry according to the invention, which has a curvature having lead of the threading line to the radial beam. The first radius $r_1$, the second radius $r_2$, and the third radius $r_3$ are again shown, which are selected in accordance with FIG. 2. It is assumed that the radius $r_2$ delimits the first area 14 having the initial flow separation radially on the outside. Because of the flow separation in the first area 14, as explained above, a blockade effect and a flow displacement radially outward occur. However, because of the lead of the threading line of the rotor blade 3 and the rear edge 11, which is consequently inclined forward, a smaller area results on the rotor blade 3 for which the inflow velocity increases through this effect. The radial extension of the second area 15, in which a flow stall is caused by the flow deflection, is thus reduced in comparison to a radial beam rotor. It is essential for the expansion of the available operating range that the rotor blade geometry according to the invention does not yet result in a full separation of the flow extending over the entire radius in comparison to a radial beam geometry for the operating range outlined in FIG. 4.

Corresponding to the preceding description, a curve of the threading line 6 relative to the radial beam 5, which results in a lag of the threading line 6 in relation to the peripheral direction, results in a reinforcement of the flow separation. However, such a deviation from the radial beam geometry can also be advantageous in specific operating ranges, so that Wells turbines, for which the problems of a complete flow stall can be precluded because of the facility configuration, by implication have a higher efficiency averaged over all operating points. This circumstance results from an efficiency increase at flow coefficients for which flow separation extending over the entire radial extension does not exist—such an operating point is outlined in FIG. 5.

Figure 5:
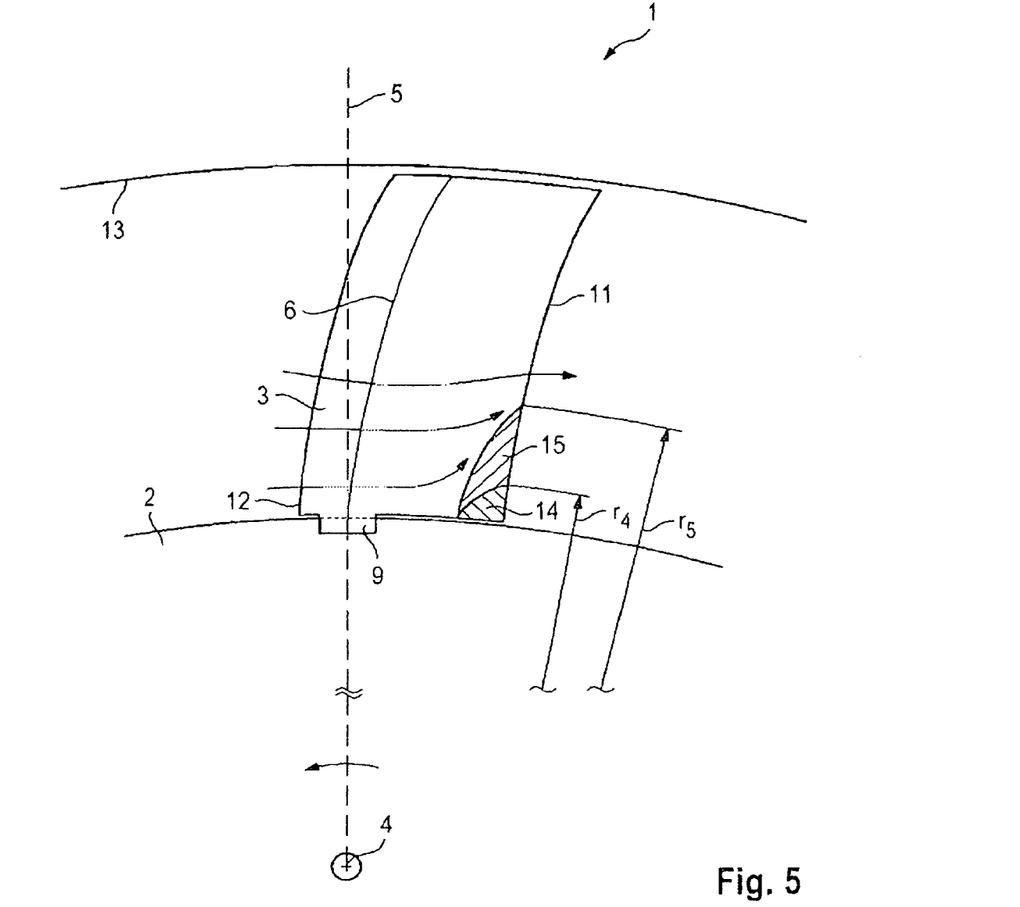
FIG. 5 shows the inflow conditions for a flow coefficient, for which a large-area flow separation does not yet exist in the case of a rotor blade geometry according to the invention having a threading line trailing in relation to the radial beam.

An exemplary embodiment having a lag of the curved threading line 6 in relation to the radial beam 5 is shown in FIG. 5. In addition, it proceeds from an operating point for which a maximum flow coefficient exists, which only results in an initial flow stall in a very locally limited area close to the hub. For this purpose, the first area 14 is again outlined in FIG. 5, which is delimited radially on the outside by the radius $r_4$. Because of the blockade effect and the radial flow deflection resulting therefrom, a flow separation additionally occurs in a second area 15, which is delimited radially on the outside by the radius $r_5$. Because of the deviation according to the invention of the threading line 6 from the radial beam 5, both the first area 14 and also the second area 15 extend further in the radial direction in relation to a radial beam geometry. Accordingly, the flow deviates further radially outward because of the blockade effect due to the flow stall and enlarges the driving torque to larger radii of the rotor blade and thus into the areas of the greater lever arm, with the result of a higher power consumption. This results in improved efficiency of the Wells turbine.

The geometry according to the invention for the rotor blades of the Wells turbine can be supplemented by additional measures, which in turn delay a flow stall. Roughened areas on the surface of the rotor blades come into consideration for this purpose, which have an influence on the flow boundary layer and delay the formation of flow separations outward.

Further modifications are possible in the scope of the following claims. A further measure may be seen in providing the rotor blade geometry according to the invention with an active or passive angle adjustment mechanism 9 for turning the rotor blade out of the rotation plane. This can be used for the purpose of reducing the angle of attack for the inflow in the case of higher flow coefficients and thus delaying a flow stall outward. In addition, the self-starting behavior of the Wells turbine is improved by this measure. For this embodiment design, the threading line 6 in the neutral position of the rotor blade 3, in which the symmetry plane of the profile is in the rotation plane, will also have a curvature to the radial beam 5 according to the invention. Both a lead and also a lag come into consideration in this case.

Figure 6:
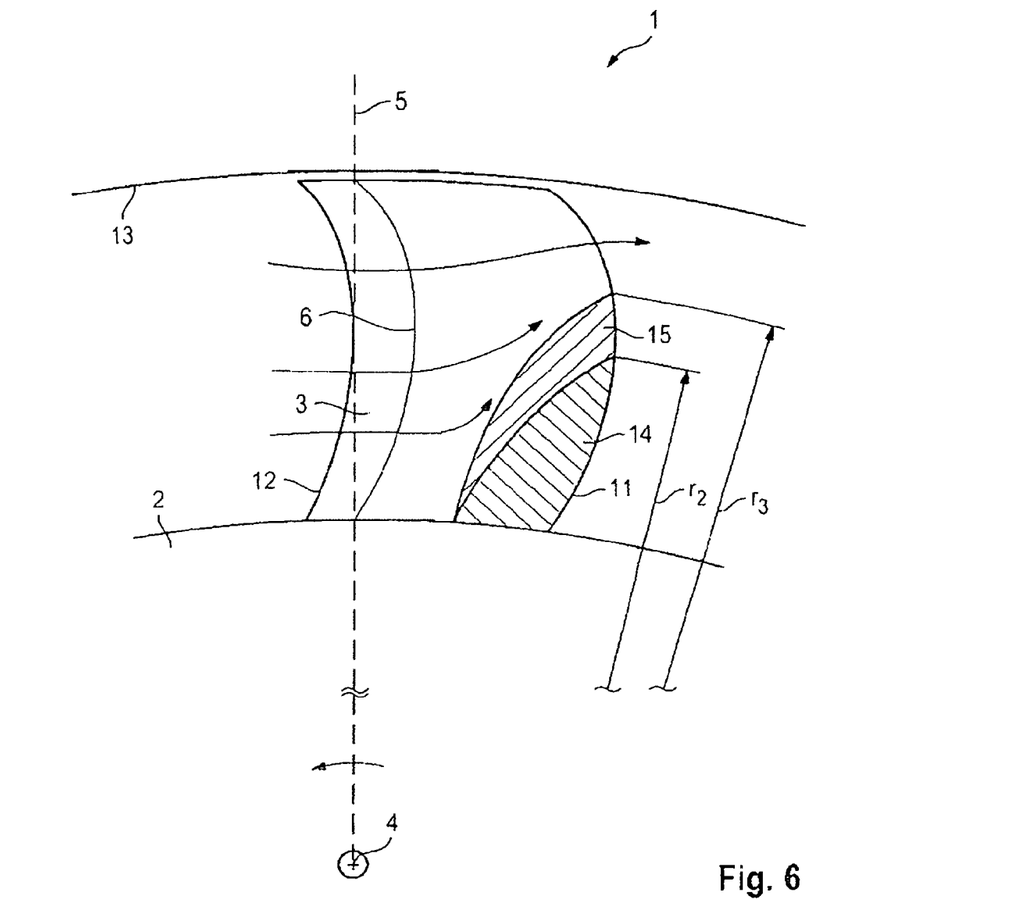
FIG. 6 shows a further design variant of a rotor blade according to the invention having a sickle-shaped set-back threading line.

FIG. 6 outlines a further exemplary embodiment of a rotor blade 3 according to the invention. For the present case, a sickle-shaped curved threading line 6 exists, which is applied trailing the radial beam 5. Notwithstanding the above-described embodiments, the threading line 6 is led back to the radial beam again in the radially outer area of the rotor blade 3 and intersects it at the radial outermost extension of the rotor blade 3.

Through the lag of the radially inner areas up to a first threshold value for the flow coefficients, the efficiency increase explained above in connection with FIG. 5 occurs through a flow displacement radially outward. For higher flow coefficients, however, the radial extension of the flow separation is restricted by a successive return of the threading line 6 of the rotor blade to the radial beam. Correspondingly, the rear edge 11 will run curved forward radially outside the radius $r_2$ and will delimit the extension of the second area 15 of the secondary flow separation, so that the flow separation does not occur over the entire surface.

Figure 7:
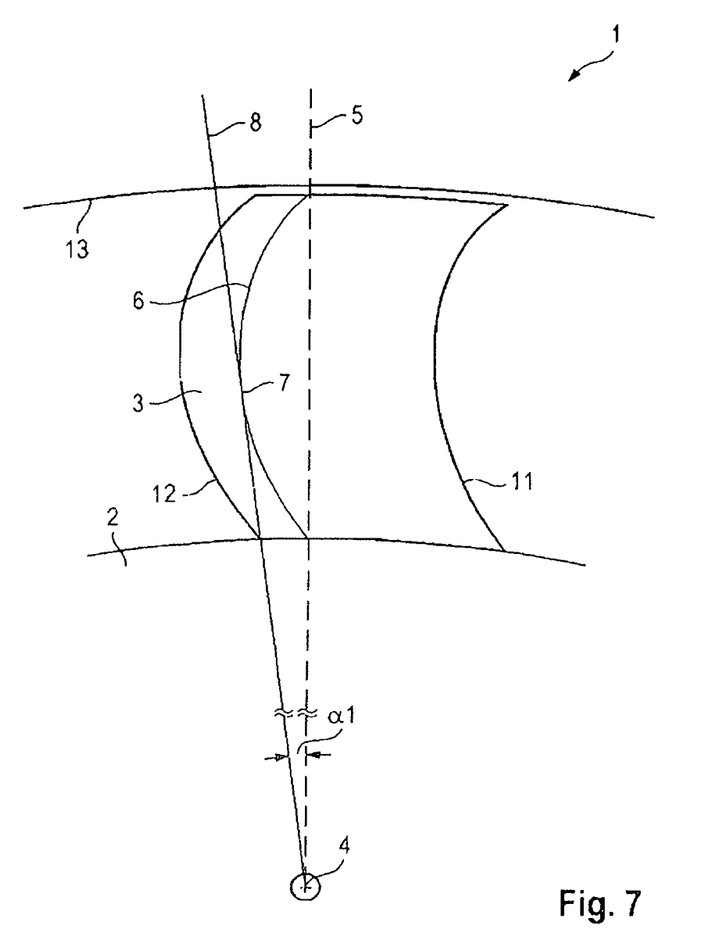
FIG. 7 shows an alternative design of a rotor blade according to the invention having a sickle-shaped protruding threading line.

Furthermore, FIG. 7 shows an embodiment alternative having a forward-curved sickle shape of the threading line cores, the threading line 6 being returned back to the threading line 6 at the radially outer end of the rotor blade 3. For the point of the greatest radial beam deviation 7, the angle deviation α1 to the radial beam is fixed for this exemplary embodiment, which is distinguished by noise reduction. The losses to be attributed to acoustic effects are accordingly reduced.

Further designs of the invention in the context of the following claims are conceivable. Thus, the deviation of the threading line 6 from the radial beam 5 can only exist over a limited radial extension of the rotor blade 3. However, it is preferable to implement the threading line 6 as not congruent with the radial beam 5 over at least one-third of its course.

LIST OF REFERENCE NUMERALS

Wells turbine
2 hub
3, 3.1, 3.2, 3.3 rotor blade
4 rotational axis
5, 5.1, 5.2, 5.3 radial beam
6, 6.1, 6.2, 6.3 threading line
7 point of the greatest radial beam deviation
8 straight line through the point of the greatest radial beam deviation
9 blade angle adjustment unit
10 blade tip eddy
11 rear edge
12 leading edge
13 wall of the flow duct 14 first area
15 second area
α1, α2, α3 angle deviation

The invention claimed is:

1. A Wells turbine, comprising:
a bidirectional rotor having essentially axial inflow, which maintains a revolution direction independently of a direction of an inflow;
the bidirectional rotor comprising a huh having rotor blades, wherein the rotor blades are distributed over an outer circumference of the hub, point radially outward from the hub, and are designed as symmetrical to a rotation plane perpendicular to a rotational axis of the hub, and have a drop-shaped profile;
the rotor blades comprising a threading line having a course in the rotation plane that deviates in relation to a radial beam associated with a respective one of the rotor blades at least in parts of a radial extension of the rotor blade, the threading line comprising at least one curved area;
the threading line being led back in a radially outer part of the rotor blade to the radial beam and intersecting the radial beam at a radially outmost extension of the respective one of the rotor blades.

2. The Wells turbine according to claim 1, wherein the at least one of a lead or lag of the threading line at a tip of the respective one of the rotor blades in relation to the radial beam is at least 5°.

3. The Wells turbine according to claim 2, wherein the threading line is not congruent with the radial beam over at least one-third of the course of the threading line.

4. The Wells turbine according to claim 3 wherein the respective one of the rotor blades has a rear edge which is at least one of inclined and curved in relation to a parallel to the radial beam at least in parts.

5. The Wells turbine according to claim 2, wherein the respective one of the rotor blades has a rear edge which is at least one of inclined and curved in relation to a parallel to the radial beam at least in parts.

6. The Wells turbine according to claim 1, wherein the threading line is not congruent with the radial beam over at least one-third of the course of the threading line.

7. The Wells turbine according to claim 6, wherein the respective one of the rotor blades has a rear edge which is at least one of inclined and curved in relation to a parallel to the radial beam at least in parts.

8. The Wells turbine according to claim 1, wherein the respective one of the rotor blades has a rear edge which is at least one of inclined and curved in relation to a parallel to the radial beam at least in parts.

9. The Wells turbine according to claim 1, wherein the threading line is established by points which, for cylindrical profile sections, lie on a camber line at one-fourth of a profile depth.

10. The Wells turbine according to claim 1, wherein irregularities which influence a boundary surface flow exist at least in parts on a surface of at least one of the rotor blades.

11. A wave powerplant having a Wells turbine comprising:
a bidirectional rotor having essentially axial inflow, which maintains a revolution direction independently of a direction of an inflow;
the bidirectional rotor comprising a hub having rotor blades, wherein the rotor blades are distributed over an outer circumference of the hub, point radially outward from the hub, and are designed as symmetrical to a rotation plane perpendicular to a rotational axis of the hub, and have a drop-shaped profile;
the rotor blades comprising a threading line having a course in the rotation plane that deviates in relation to a radial beam associated with a respective one of the rotor blades at least in parts of a radial extension of the rotor blade, the threading line comprising at least one curved area;
the threading line being led back in a radially outer part of the rotor blade to the radial beam and intersecting the radial beam at a radially outmost extension of the respective one of the rotor blades.

12. The wave powerplant according to claim 11, wherein the rotor blades of the Wells turbine adjoin a wall of a flow duct in a radial direction.

* * * * *

UNITED STATES PATENT AND TRADEMARK OFFICE
CERTIFICATE OF CORRECTION

PATENT NO. : 8,678,745 B2  
APPLICATION NO. : 12/735589  
DATED : March 25, 2014  
INVENTOR(S) : Arlitt et al.

Page 1 of 1

It is certified that error appears in the above-identified patent and that said Letters Patent is hereby corrected as shown below:

In the claims

Column 7, line 9, "huh" should be changed to --hub--.

Signed and Sealed this
Eleventh Day of November, 2014

Michelle K. Lee
*Deputy Director of the United States Patent and Trademark Office*